United States Patent
Brittan (10) Patent No.: US 8,255,338 B1
(45) Date of Patent: Aug. 28, 2012

(54) METHOD FOR DESIGNING AND ESTIMATING COSTS OF FOOD SERVICE EQUIPMENT

(76) Inventor: Jeffrey C. Brittan, Edmonds, WA (US)

( * ) Notice: Subject to any disclaimer, the term of this patent is extended or adjusted under 35 U.S.C. 154(b) by 13 days.

(21) Appl. No.: 11/652,173

(22) Filed: Jan. 10, 2007

Related U.S. Application Data (60) Provisional application No. 60/758,000, filed on Jan. 10, 2006.

(51) Int. Cl.
*G06Q 99/00* (2006.01)

(52) U.S. Cl. .................. 705/400; 705/26.1; 705/27.1

(58) Field of Classification Search .............. 705/28, 705/29, 30, 400, 27, 1, 26.1, 27.1; 715/502, 715/778; 703/1; 345/653, 419, 522, 582, 345/778; 382/154
See application file for complete search history.

(56) References Cited

U.S. PATENT DOCUMENTS

| | | | | |
|---|---|---|---|---|
| 4,862,376 | A | | 8/1989 | Ferriter et al. ............. 364/468 |
| 5,163,536 | A | * | 11/1992 | Tuhro et al. ................ 186/44 |
| 5,920,849 | A | * | 7/1999 | Broughton et al. ......... 705/400 |
| 6,393,410 | B1 | * | 5/2002 | Thompson ................. 705/37 |
| 6,775,647 | B1 | | 8/2004 | Evans et al. ................ 703/7 |
| 6,801,218 | B2 | | 10/2004 | Susnjara ................... 345/653 |
| 6,810,401 | B1 | * | 10/2004 | Thompson et al. ........ 1/1 |
| 6,813,610 | B1 | * | 11/2004 | Bienias ...................... 705/26.5 |
| 7,254,553 | B2 | * | 8/2007 | Fogelson ................... 705/14.39 |
| 7,277,572 | B2 | * | 10/2007 | MacInnes et al. ......... 382/154 |
| 7,337,151 | B2 | * | 2/2008 | Lopez et al. ............... 705/400 |
| 7,499,838 | B2 | * | 3/2009 | Jaworski et al. .......... 703/1 |
| 7,499,839 | B2 | * | 3/2009 | Massaro et al. ........... 703/1 |
| 7,617,117 | B2 | * | 11/2009 | Starkey .................... 705/7 |
| 7,868,893 | B2 | * | 1/2011 | Feth et al. ................. 345/522 |
| 8,065,623 | B2 | * | 11/2011 | Bohlman .................. 715/768 |
| 2002/0062218 | A1 | * | 5/2002 | Pianin ....................... 705/1 |
| 2002/0093538 | A1 | * | 7/2002 | Carlin ....................... 345/778 |
| 2003/0122852 | A1 | * | 7/2003 | Susnjara ................... 345/653 |
| 2005/0278670 | A1 | * | 12/2005 | Brooks et al. ............. 716/5 |

OTHER PUBLICATIONS

"Chapter 300 Project Design Phases", Jan. 30, 2006, North Carolina—State Construction Manual, pp. 300-1 to 300-19; 19 pages.*
Wells, Annabel, "The inside story: Improved Software Has Added a New Dimension to Dassault's Falcon Jet Completion Center", Dec. 8, 1999, Flight International , p. 48, 4 pgs.*

* cited by examiner

*Primary Examiner* — John Hayes
*Assistant Examiner* — Freda A Nelson
(74) *Attorney, Agent, or Firm* — Dean A. Craine (57) ABSTRACT

A method for designing and estimating the cost of constructing a food equipment area that uses a computer with a specifically designed software program loaded into its memory that provides a visual interface showing the layout of a food preparation area in which food equipment will be installed. The program allows the user to drag and drop various pieces of food equipment into the layout. As the different pieces of food equipment are added, the layout area is immediately updated along with the accompanying technical and quotation data sheets. The layout can be changed to show many variations of the same project. During use, the rough dimensions and the locations of the existing water, gas, electrical, and drain connections can be imputed enabling the customer to identify what change, if any, must be made in order to install the equipment. The software program also provides a list of additional components that must be used in order for the selected equipment to be use.

1 Claim, 6 Drawing Sheets

METHOD FOR DESIGNING AND ESTIMATING COSTS OF FOOD SERVICE EQUIPMENT

This is a utility patent application which claims benefit of U.S. Provisional Application No. 60/758,000 filed on Jan. 10, 2006.

BACKGROUND OF THE INVENTION

1. Field of the Invention

This invention pertains to methods for designing and estimating the cost of construction and more particularly, to methods for designing and estimating the cost of food service equipment in a business or residence.

2. Description of the Related Art

The design or layout of a kitchen or food preparation area in a business or residence is very important for convenience and efficiency. Located in the food preparation area are different categories of equipment, such as refrigerators, electric stoves and ovens, gas stoves and ovens, warming trays, microwave ovens, beverage dispensers, storage racks, to name a few. Each category of equipment includes various pieces of equipment made by different manufacturers.

Each category of equipment is available in different sizes and styles. For example, a storage rack designed to hold pots and pans in a kitchen may be available in 30, 48 or 60 inches in length. Also, such racks may also be sold with fixed legs or legs mounted on casters. Further, such racks may include fixed or adjustable shelving or doors that open to the left or right. These factors are but a few of the factors that must be taken into consideration when designing a new kitchen or food preparation area.

When selecting a specific piece of food service equipment, it is important to consider the electric or gas utility connections, the drains, and the ventilation ducts requirements. It is also important to know if theses items in the existing food preparation area need to be modified to accommodate the new food service equipment.

Customer's usually purchase food service equipment from a qualified salesman who typically prepares a rough sketch of the food preparation area with the selected equipment shown therein. Normally, the sketch is then delivered to an estimator who then provides a written estimate to the customer. The customer either approves the estimate or meets again with the salesman to go over changes. A new sketch is then submitted to the estimator. The process of submitting sketches and estimates back and forth between the parties is very time consuming.

Ideally, it is desirable for the salesman to immediately show the customer a plan or elevational view of the proposed food preparation area. Such views would show the exact locations of the food service equipment in the food preparation area. It is also desirable to modify the views on the fly showing alternative pieces of equipment and fixtures. It is also important to provide a cost estimate for each design of the food preparation area that the customer can quickly consider and consummate the transaction.

SUMMARY OF THE INVENTION

It is an object of the present invention to provide a method for designing and estimating costs of the food service equipment in the food preparation area in a business or residence.

It is another object of the present invention to provide such a method that presents a plan and elevational view of the proposed food preparation area containing different pieces of food service equipment.

It is still further object of the invention to provide such a method that presents different categories of food service equipment, and then enables the user to select different pieces of equipment that can be moved to different locations within the plan and elevational views of the proposed food preparation area.

It is another object of the present invention to provide a method that informs the user of any utility connecting requirements or optional accessories for each piece of food service equipment.

It is another object of the invention to provide such a method that provides an up-to-date estimate of the total cost of the new equipment and any accessories required to use the new equipment.

These and other objects of the present invention are met by the method of designing and estimating the cost of food service equipment in a designed food preparation area that uses a computer with a specifically designed software program loaded into its memory that provides a visual interface showing the layout of a food preparation area in which food equipment will be installed. The method is primarily intended to be used by food service professionals that allow them to save sale time, improve accuracy, and provide immediate feedback to their customers.

More specifically, the method uses a computer with a food service equipment layout and estimator software program, hereinafter referred to as the software program, loaded into its memory. The software program provides a visual interface showing the general or specific layout of a food preparation area. In the preferred embodiment, the interface is divided into a primary graphic window and a category list window. Displayed in the primary graphic window are top and side elevational views of the food service equipment. When the software program is initially opened, the category list of equipment is automatically presented. When a general category item is selected, a second interface is displayed showing the specific pieces of equipment in the programs equipment database. When a specific piece of equipment is selected, specific information for the piece of equipment is provided, such as the front, side and top plan views, the model number, the description, the price, the dimensions, the weight, utility requirements and accessories. During use, the user is able to drag and drop the graphic image of the piece of equipment into the layout shown in the first window. As the different pieces of food equipment are added, the layout area is immediately updated along with the accompanying technical and quotation data sheets.

The rough dimensions of the food preparation area can be entered into the software program prior to selecting the equipment. Also the locations and height restrictions of any gas, electrical power, ventilation ducting, and drains can be entered into the program.

As noted above, the software program identifies the types of water, electrical, gas, and waste connections needed in order for the selected equipment to be used within the designated area. The software program also identifies any additional required components or accessories that may be used with the selected equipment.

The software program also provides an updated list of all of the pieces of equipment and accessories selected. Also provided is an itemized cost listing and a total cost listing. By reviewing these costs, the user is able to easily determine whether the project is on or off budget. The user is then able to easily deselect equipment from the food preparation area and replace it with a new piece of equipment. Because the software program immediately updates all of the data, the user is able to immediately determine the impact the changes have on the project's budget.

Another major benefit of the method is that customers are able to view a plan, elevational, and end views of the food equipment service area with different types of food service equipment located therein. With this information, customers are able to determine if the location of the equipment is optimized for work flow efficiency. Using the program, the customer is able to move equipment around within the work area.

DESCRIPTION OF THE PREFERRED EMBODIMENT(S)

Shown in the accompanying Figs. is a method for designing and estimating the cost of a food preparation area by a sales representative 10 that produces graphic images and an estimated cost sheet 100 of a proposed food preparation area containing different combinations of food service equipment. Using the method described herein, the sales representative 10 is able to easily produce and manipulate the graphic images and the cost sheet 100 that enables the customer 12 to easily compare different configurations. Also after seeing the different graphic images of the food preparation area with different combinations of food service equipment, the customer 12 is better able to determine if the food preparation area is designed for optimal work efficiency.

Figure 1:
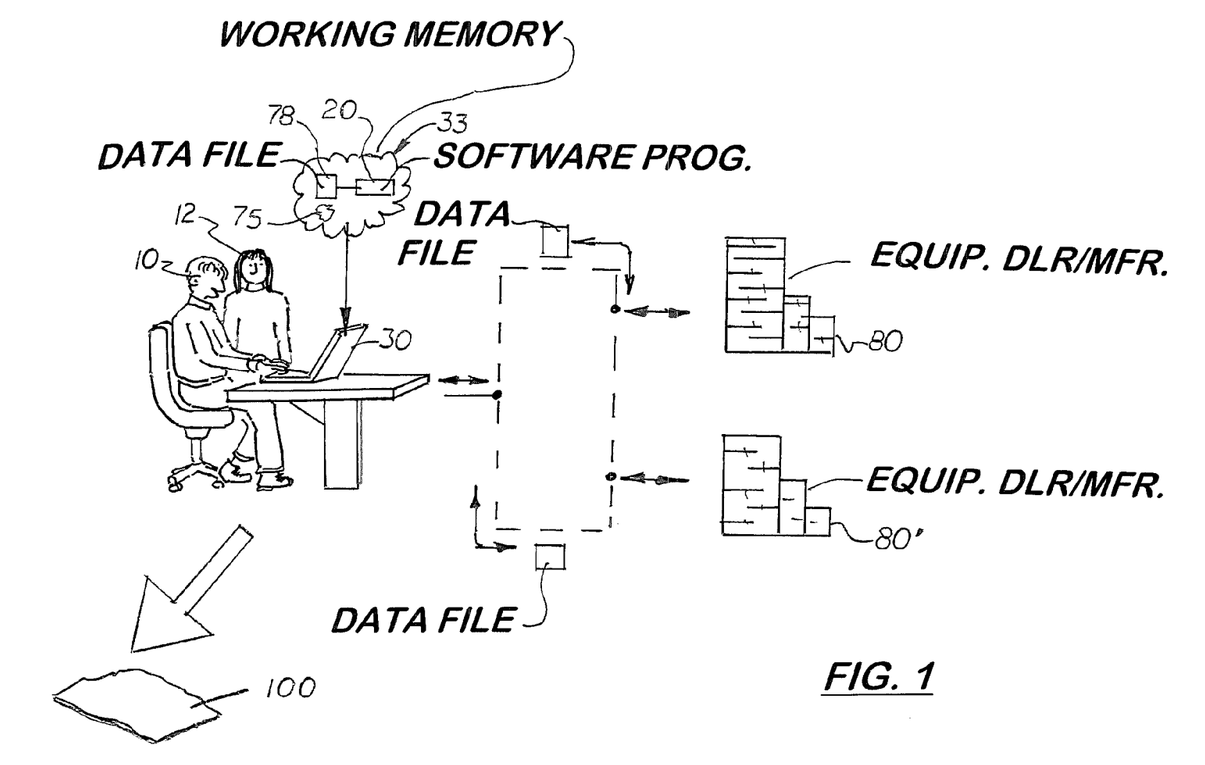
FIG. 1 is an illustration of a customer meeting with a sales representative that uses a laptop computer to design and receive an estimate for a proposed food preparation area via a wide area network.
Figure 2:
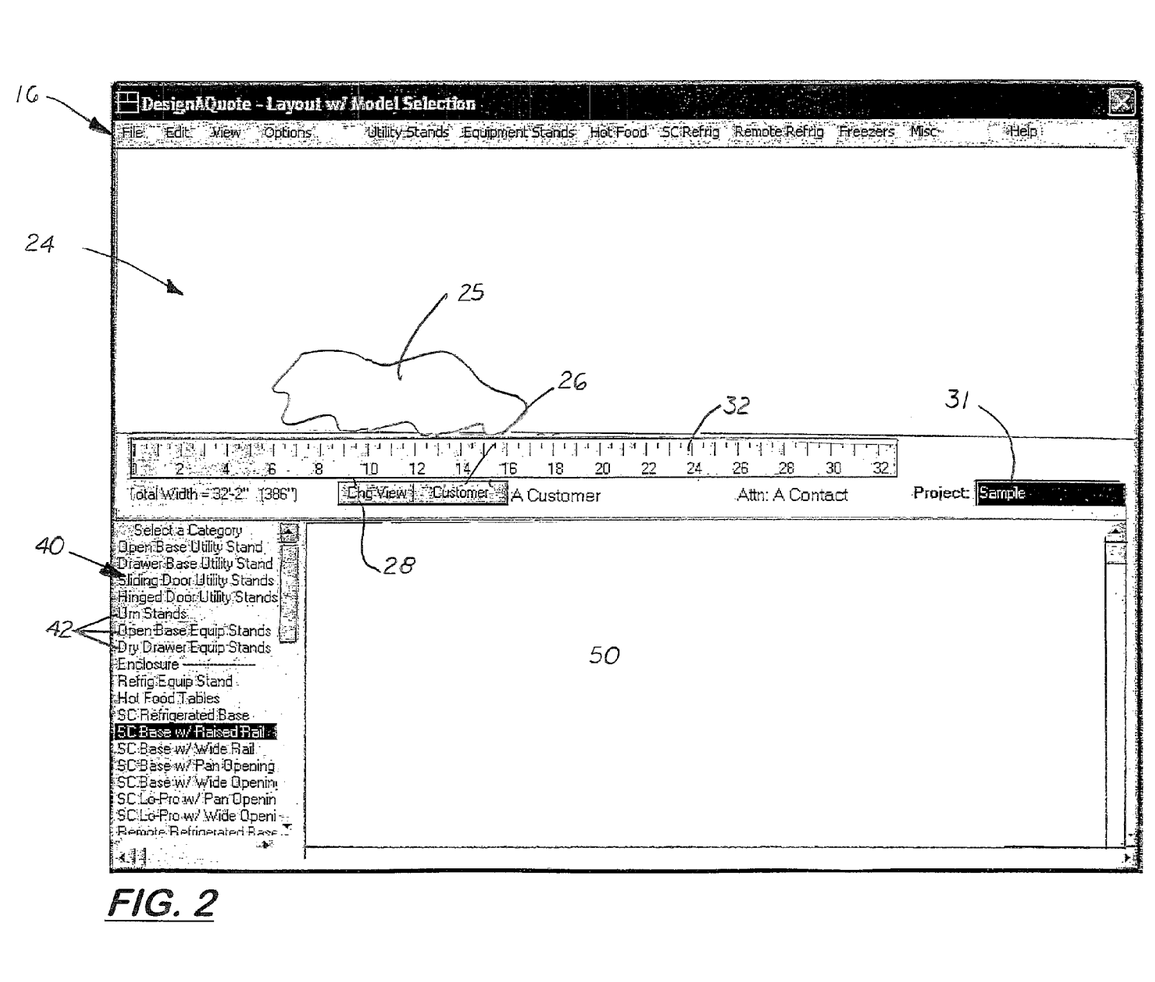
FIG. 2 is an illustration of the initial main display screen showing the primary graphic window, and the category list window.

In the preferred embodiment, the method uses a software program 20 designed to present a display screen 16 with a primary graphic window 24 of the food preparation area shown in FIG. 2. As the program 20 is used, a designated area 25 on the window is filled with images of various food service equipment that are selected by the customer 12. In the preferred embodiment, the primary graphic window 24 contains a top plan and a side elevational view of the food preparation area. Also, provided in the primary graphic window 24 is a customer selection button 26, a change view button 28, a project title box 31, and a dimension scale indicator 32.

Also presented on the display screen 16 is a category list window 40 containing a list 42 of different categories of food service equipment. During operation, the sales representative 10 selects an item from the category list 42. Each item on the category list 42 is associated with at least one scaled graphic image which is shown in a secondary graphic window 50 located adjacent to the category list window 40. When an item is determined, the graphic image associated with the item is highlighted and then dropped and dragged into a designated area on the primary graphic window 24. The graphic image of the piece of equipment is automatically inserted into the primary graphic window 24.

Figure 3:
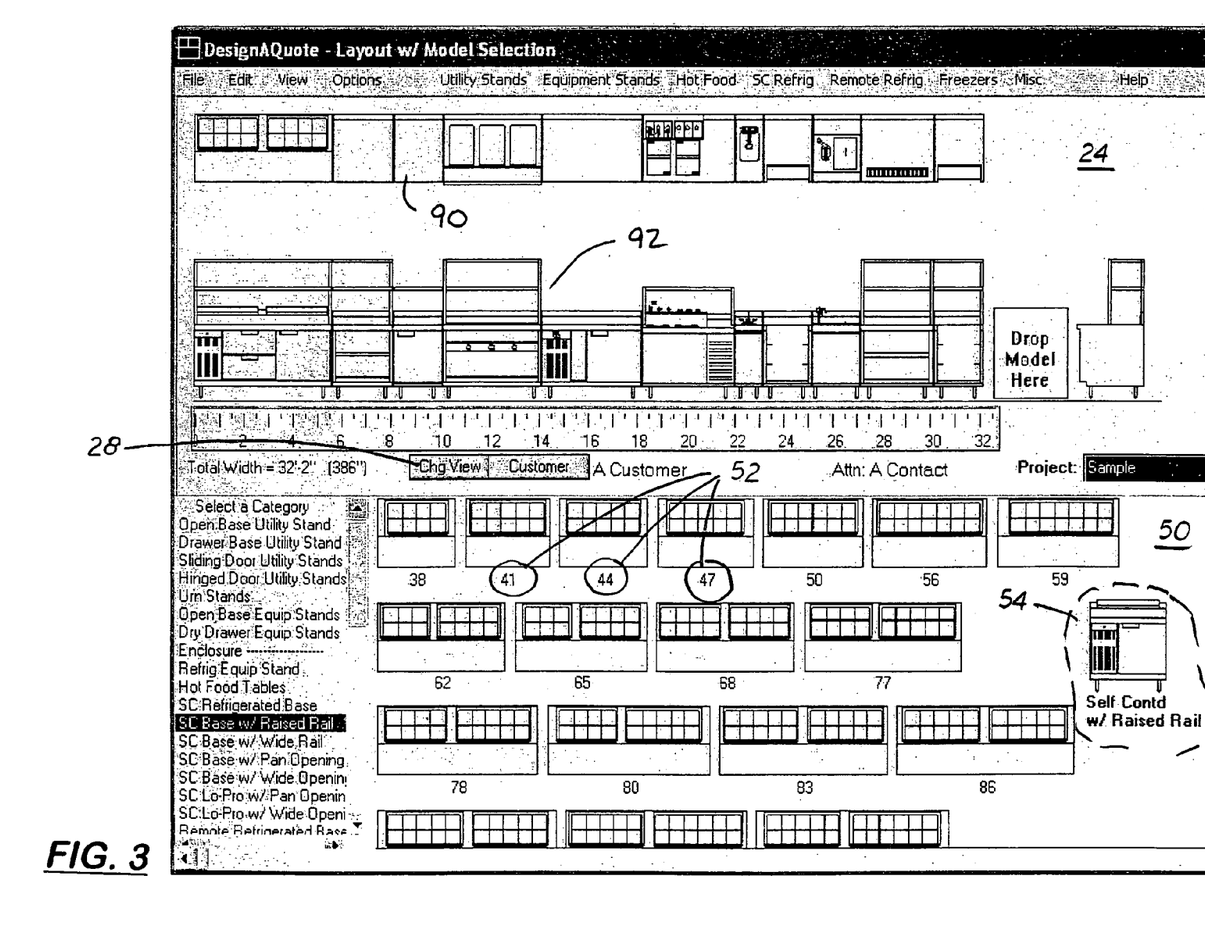
FIG. 3 is another illustration similar to the illustration shown in FIG. 2 showing the equipment images of a selected category of equipment in the secondary graphic window.

When an item on the category list 42 of food service equipment is selected, a plurality of images associated with the different pieces of food service equipment that fall under the category is presented in the secondary graphic window 50 as shown in FIG. 3. The images of different pieces of food service equipment are drawn in the same perspective and scale as the images shown in the primary graphic window 24. Associated with each image in the secondary graphic window 50 is a size or dimension number 52 and a description 54. During use, a particular piece of equipment is selected and the image of the piece of equipment is highlighted and then dropped and dragged into a designated area in the primary graphic window 24. The process is continued until all of the desired categories of food service equipment and pieces of equipment have been selected.

Figure 4:
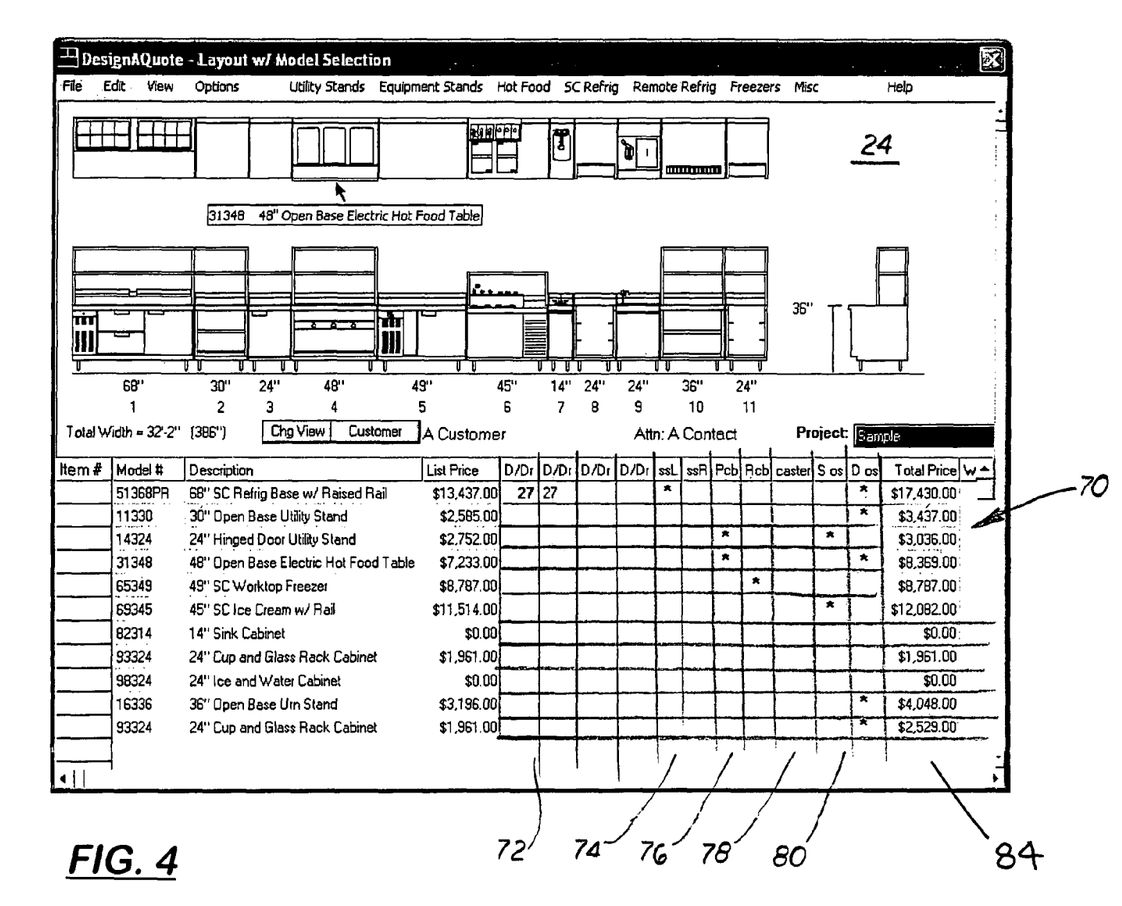
FIG. 4 is an illustration showing the equipment list window.

After all of the pieces of food service equipment has been selected and dropped and dragged into the primary graphic window 24, the change view button 28 is selected which replaces the category list 42 and the secondary graphic window 50 with an itemized equipment list window 70, shown in FIG. 4. In the itemized equipment list window 70 is a list of all of pieces of food service equipment shown in the primary graphic window 24. The itemized equipment list window 70 is divided into columns 72, 74, 76, 78, 80 showing the item number, the model number, the description of the item, the list price and various available options. (D/Dr is door or drawer; ssL and ssR is for stainless steel left or stainless steel right ends' Pcb and Rcb stand for different cutting board types; Casters mean castor wheels; and Sos and Dos mean sing or double shelving). Located in the right side column 84 is the total price of the food equipment At any time, the accessories can be selected and deselected which are automatically reflected in the total cost column. Also, any piece of food service equipment shown in the primary graphic window 24 can be highlighted and moved to another location thereby enabling the sales representative 10 to adjust the layout for optimal efficiency. If a new category of food service equipment is desired, the sales representative 10 selects the change view button 28 which then presents the category list 42. The sales representative 10 then selects a new category of equipment from the list 42 as described above. A new list of pieces of equipment is then presented. The new desired piece of equipment is selected and dropped and drag into the graphic image at the precise location. The primary graphic window 24 is automatically adjusted. The equipment list window 70 is automatically adjusted.

For a sales representative 10 and a customer 12, some of the benefits of the method include the following: enables the new design to stay within the customer's budget; allows the customer to see and consider different layouts; quickly provides cost estimates for proposed changes to the layout; enables drawings to be prepared quickly and easily; and allows orders to be quickly and easily transmitted to the manufacturer or sales representative.

For equipment dealers and manufacturers 80, 80' some of the benefits of the method include the following: enables proposed jobs to be quickly received and processed by the manufacturer 80 or 80'; allows the manufacturer 80, 80' to easily identify questions or issues that may arise that can be quickly and easily addressed; allows the order to be quickly approved and confirmed before production begins; eliminates wasted time for preparing quotes and drawings for projects not yet approved; allows manufacturers 80 or 80' and sale representatives 12 to easily identify ancillary parts and components that may be necessary; eliminates errors during order entry; and allows installation drawing and instructions to be easily and quickly prepared.

The software program 20 is loaded into the working memory 33 of the computer 31. The software program 20 may be designed to operate on Windows, or APPLE-based operating systems. When the software program 20 is initially loaded in the computer's memory 33, an opening screen 16 is presented on the display as shown in FIGS. 2-6. Presented on the opening screen 16, is the project name 52, the customer's name 54. Located on the opening screen 16 is a first window 24 in which a graphic image of the food preparation area is presented. As stated above, the graphic image may include a top plan view 90 and a side elevational view 92 of the area.

Also presented on the secondary graphic window 50 are elevational views of the individual product(s) 58, along with the product's order number 60, the dimensions of the product 62, the overall dimension of the layout 64; and the locations of the electric, gas, water and drain utilities.

In the software program 20 is a category data file 78 containing all of the category names of products sold by the sales representative. Associated with each category name is a plurality of products. Associated with each product are a secondary data sheet 70 and an image file and the price of the product 72, the product's weight 74, and any necessary accessories 76, which are shown in FIG. 4. During use, the graphic file of the area 75 is loaded into the computer 30. The user then opens the category data file 78. The user then uses his or her mouse to click on the category name of a desired product. The image file of the products under the category names are then displayed. The user then clicks on the desired image file and drags it into the primary graphic window 24.

The software program 20 is also designed to provide a project info screen 71 as shown in FIG. 4, that includes project information, record view of the customer's database files, company and personal information, method used to submit information, method for exporting information including file types and formats, list, net and sale prices for each product.

Figure 5:
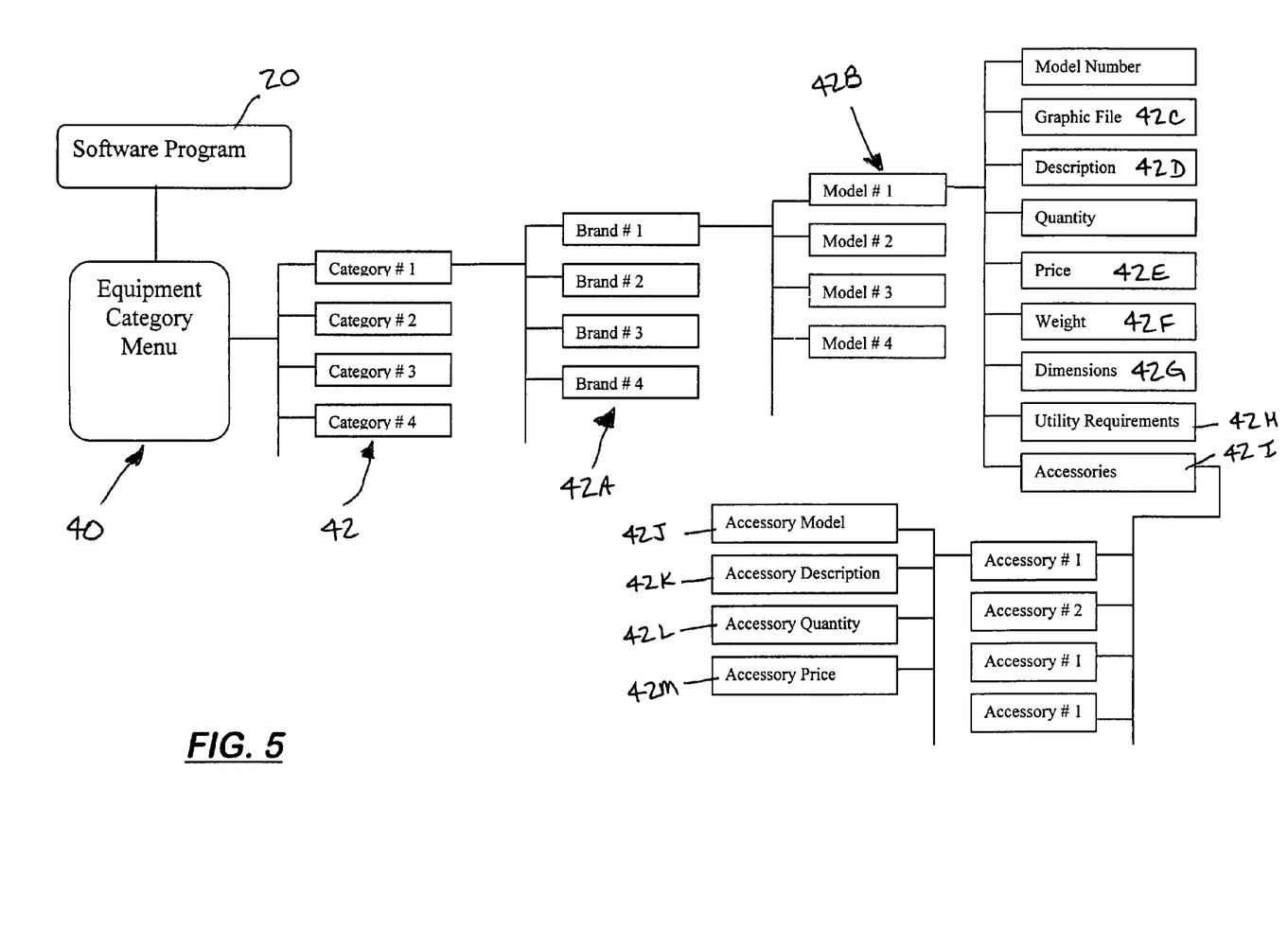
FIG. 5 is a block diagram showing the various databases used by the software.

FIG. 5 is a block diagram that shows the association of the various data files used by the software program 20. The equipment category menu 40 presents a list of categories of equipment 42. Each category of equipment 42 can be divided into the brand name or manufacturer 42A, or model number 42B. Associated with each model number is a graphic file 42C, a description 42D, a price 42E, a weight 42F, dimensions 42G, utility requirements 42H, and accessories 42I. Each accessory can then be divided into accessory model 42J, description 42K, quantity 42L and price 42M.

Figure 6:
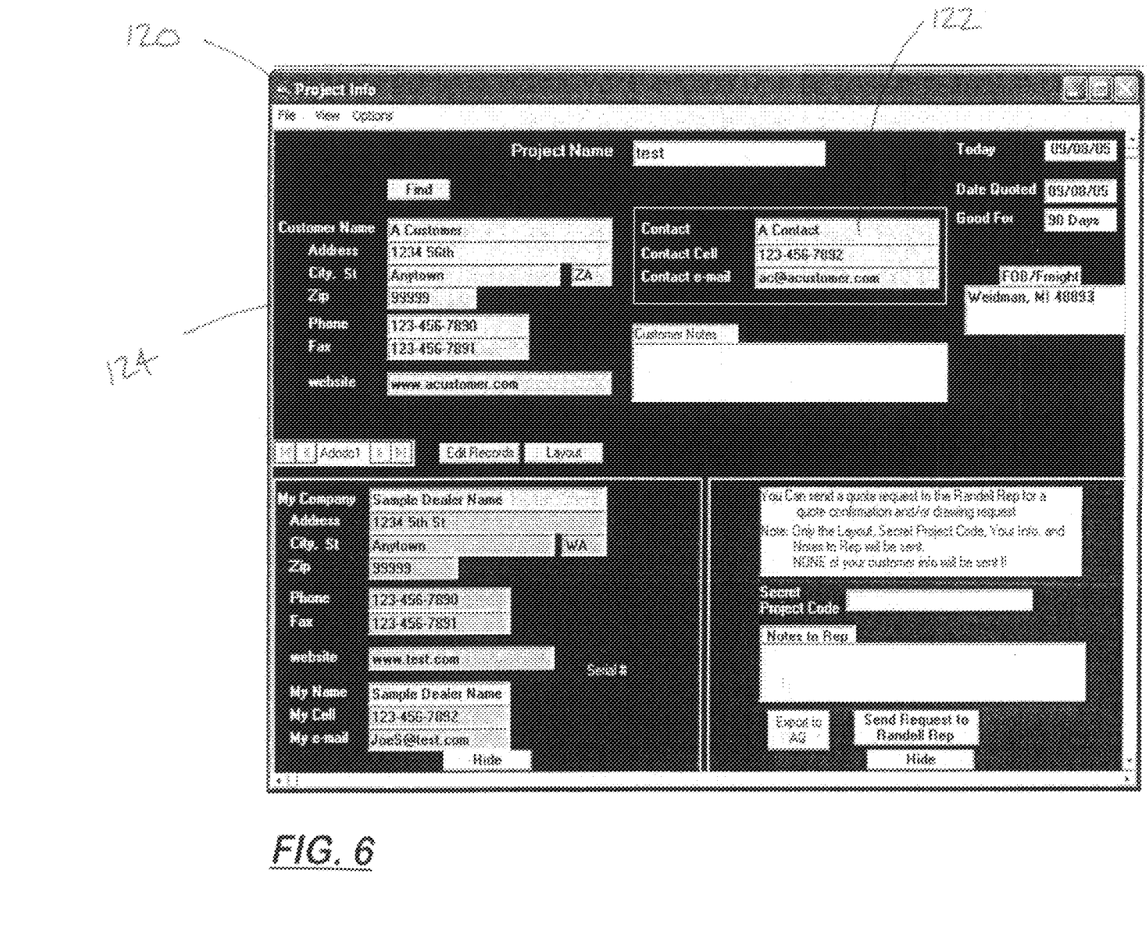
FIG. 6 is a customer information window.

On the customer database screen 120 shown in FIG. 6, the sales representative 10 is able to add or delete customers from the database. The sale's representative 10 is also able to edit the customer contact names 122; customer information 124; sort and maintain the database; and import and export customer records.

An optional print feature is provided that allows the sales representative 10 to review the printed document prior to printing. The print preview window also allows the sales representative 10 to save the file as a PDF that can then be easily emailed to the customer 12 or to the equipment dealer 80 or manufacturer 80'. Once the desired equipment is selected, all the pages may be printed.

The software program 20 includes many features, as standard that can be personalized for each individual. For example, various window colors can be set to match the user's taste. ToolTips menu can be set to display either the model number and description of the product, or the model number and price of the product.

The software program 20 can also be customized to a manufacturer's 80 or 80' requests and recommendations. By configuring the software program to provide layout and description features only, without prices, the customer 12 will be required to contact the manufacturer and/or sales representative 10 or manufacturer 80, 80' for a quotation. The software program 20 may also include a 'Quote Request' button that can be configured to send the request to the manufacturer 80, 80' and/or sales representative 12 for a quotation. Also, cad drawing files or PowerPoint™ files can be accessed from within the software program 20. Logo, letterhead, pictures, detailed specifications, and contact info can be imbedded into different portions of the software program 20. Watermark can be imbedded in printed or emailed output. Custom data exports can be designed to interface with manufacturer's software.

In the preferred embodiment, the software program 20 is loaded into a network server that remote computers connected via a LAN to download and upload information. It should be understood, that the software program 20 could be loaded into a network server connected to a WAN, such as the Internet, suitable client side and host side communication application would be provided to facilitate communication between the server and the client computers.

In summary, a method for designing and estimating the cost of a food service comprising the following steps:

a. selecting an area for food preparation area in a building;

b. selecting a computer 30 with working memory 33 and a display; and c. loading a food equipment designing and estimating software program 20 into said working memory 33 of said computer 30, said software program 20 capable of using said graphic file of the area for food service equipment to present said graphic file on said display, said software program 20 also capable of determining the types of food service equipment that will fit within the area for food service equipment, said software program 20 also capable of identifying the types of water, electrical, gas, and waste connections needed in order to use said equipment within the designated area, said software program 20 also capable of providing an estimated cost of the equipment and connectors used in the area.

In compliance with the statute, the invention described herein has been described in language more or less specific as to structural features. It should be understood however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for designing and estimating the total cost of a proposed food preparation area in a building, comprising the following steps:

a. selecting a food preparation area in a building;

b. creating a graphic file of said food preparation area;

c. selecting a computer with working memory and a display;

d. loading a food service equipment layout and estimator software program into said working memory of said computer, executing the estimation software program by a processor, causing the processor to perform the steps, comprising:

using said graphic file of said food preparation area to present a top plan view and a side elevational view of said food preparation area on said display, said top plan view and side elevational view show the size and shape of said food preparation area and the locations of specific existing or purposed utility connections located within said food preparation area, simultaneously presenting with said top plan view and said side elevational view a list of general categories of food service equipment, each said list of general categories of food service equipment includes one or more specific pieces of food service equipment, each piece of said food service equipment being associated with a graphic file that shows a top plan view and a side elevational view of each piece of food service equipment, when said specific piece of food service equipment is selected, said top plan view and said side elevational view associated therewith are automatically presented in the same scale on said top plan view and said side elevational view of said food preparation area, respectively, individually selecting and moving said view of one said piece of food service equipment into different locations within said top plan view or said side elevational view of said food preparation area thereby enabling a user to determine if a selected piece of food service equipment fits within said food preparation area, is optimally located for efficiency, and the selected piece of food service equipment's relative location to required utility connections, creating an interface in which each said piece of food service equipment shown in said top plan view or said side elevational view is listed and associated with a model number, dimensions, weight, utility hook up requirements and accessories, providing a total estimated cost of said pieces of food equipment moved into said top plan view and said side elevational view of said food preparation area shown on said display;

e. loading a graphic file of said food preparation area into said computer so that said software program presents a top plan view and a side elevational view of said food preparation area on said display;

f. selecting a desired category of food service equipment from said list of general categories of food service equipment on said display;

g. selecting a specific piece of said food service equipment on said display;

h. indicating where said food service equipment selected in step g is to be located in said top plan view or said side elevational view of said food preparation area on said display;

i. repeating steps (f) thru (h) until all the pieces of food service equipment for said food preparation area has been selected and inserted into said top plan view or said side elevational view of said food preparation area; and, j. providing a total estimated cost of selected said pieces of food service equipment.

* * * * *